US012051926B2

(12) United States Patent
Lim et al.

(10) Patent No.: US 12,051,926 B2
(45) Date of Patent: Jul. 30, 2024

(54) BATTERY PROTECTION SYSTEMS FOR DETECTING CONDUCTIVE LIQUID INGRESS AND ASSOCIATED DEVICES AND METHODS

(71) Applicant: Google LLC, Mountain View, CA (US)

(72) Inventors: James Robert Lim, Mountain View, CA (US); Haoxing Zhang, Campbell, CA (US); David Wang, San Jose, CA (US); Dietrich Shing-Quan Ho, Mountain View, CA (US); Yuanyuan Song, San Jose, CA (US)

(73) Assignee: Google LLC, Mountain View, CA (US)

( * ) Notice: Subject to any disclaimer, the term of this patent is extended or adjusted under 35 U.S.C. 154(b) by 100 days.

(21) Appl. No.: 18/047,521

(22) Filed: Oct. 18, 2022

(65) Prior Publication Data

US 2023/0066939 A1  Mar. 2, 2023

Related U.S. Application Data

(63) Continuation of application No. 17/144,807, filed on Jan. 8, 2021, now Pat. No. 11,482,872.

(51) Int. Cl.
*H02J 7/00* (2006.01)
(52) U.S. Cl.
CPC .......... *H02J 7/0031* (2013.01); *H02J 7/0013* (2013.01)
(58) Field of Classification Search
CPC .............................. H02J 7/0013; H02J 7/0031
See application file for complete search history.

(56) References Cited

U.S. PATENT DOCUMENTS

| 6,587,807 B2 | 7/2003 | Awtrey et al. |
| 2005/0077878 A1 | 4/2005 | Carrier et al. |
| 2007/0152631 A1 | 7/2007 | Seo |
| 2015/0260586 A1 | 9/2015 | Inaba et al. |

(Continued)

FOREIGN PATENT DOCUMENTS

| WO | 2017061455 | 4/2017 | |
| WO | WO-2017061455 A1 * | 4/2017 | ............. H01H 37/76 |
| WO | 2022150201 | 7/2022 | |

OTHER PUBLICATIONS

"International Preliminary Report on Patentability", Application No. PCT/US2021/065077, Jul. 4, 2023, 8 pages.

(Continued)

*Primary Examiner* — Robert Grant
(74) *Attorney, Agent, or Firm* — Colby Nipper PLLC (57) ABSTRACT

This application is directed to an electronic device powered by one or more rechargeable battery cells. The electronic device includes a first negative temperature coefficient (NTC) thermistor proximate to the battery cells, and an open capacitor coupled in parallel with the NTC thermistor. The open capacitor has an open area and two electrodes that are at least partially exposed via the open area and electrically isolated. The electronic device further includes a control circuit coupled to the NTC thermistor and the open capacitor. The control circuit is configured to detect a voltage drop across the NTC thermistor and the open capacitor if conductive liquid enters the open area of the capacitor and electrically connects the two electrodes that are at least partially exposed via the open area.

20 Claims, 8 Drawing Sheets

(56) References Cited

U.S. PATENT DOCUMENTS

2015/0346127 A1  12/2015  Kalinichev et al.
2022/0224128 A1   7/2022  Lim et al.

OTHER PUBLICATIONS

"International Search Report and Written Opinion", Application No. PCT/US2021/065077, Oct. 20, 2022, 11 pages.
"Notice of Allowance", U.S. Appl. No. 17/144,807, filed Jun. 23, 2022, 7 pages.

* cited by examiner

| Conductive Liquid | Resistivity (Ω cm) |
|---|---|
| Pure Water | 20,000,000 |
| Distilled Water | 500,000 |
| Rain Water | 20,000 |
| Tap Water | 1000-5000 |
| River water (brackish) | 200 |
| Sea water (coastal) | 30 |
| Sea water (open sea) | 20-25 |

BATTERY PROTECTION SYSTEMS FOR DETECTING CONDUCTIVE LIQUID INGRESS AND ASSOCIATED DEVICES AND METHODS

RELATED APPLICATION

This application is a continuation of and claims priority to U.S. Non-Provisional patent application Ser. No. 17/144,807, filed on Jan. 8, 2021, the disclosure of which is incorporated by reference herein in its entirety.

TECHNICAL FIELD

This application relates generally to battery technology including, but not limited to, methods and systems for detecting exposure of a rechargeable battery of an electronic device to conductive liquid and protecting the rechargeable battery from damage caused by such exposure.

BACKGROUND

Integrated lithium-ion battery packs are commonly used in electronic devices. If a lithium-ion battery pack (e.g., battery cell(s) and areas of its protection circuit module (PCM)) is exposed to water, corrosion from the water may result in cell swelling and circuit failure. In many outdoor applications (e.g., in outdoor cameras), mechanical seals are applied along with water detection mechanisms to prevent water ingress into the lithium-ion battery packs of the electronic devices. However, many of these solutions are expensive and complicated, nor can they provide a sufficient sensitivity to water or stop water ingress entirely. Therefore, there is a need for simple and cost-effective solutions of detecting water ingress into lithium-ion battery packs of electronic devices, thereby protecting the lithium-ion battery packs from further damage caused by the water ingress.

SUMMARY

This disclosure describes methods and systems for a battery pack of an electronic device that includes one or more rechargeable battery cells and a self-contained battery protection system for detecting conductive liquid ingress. The battery protection system includes a capacitor having open metal gaps (e.g., interdigitated pads) and electrically coupled in parallel with a negative thermal temperature coefficient (NTC) thermistor. If water ingress occurs at a battery pack level, it causes a change associated with the NTC thermistor to go beyond or act differently in a normal range associated with a battery temperature variation. The change associated with the NTC thermistor is one of a voltage drop across the NTC thermistor and a resistance drop of a combination of the NTC thermistor and the open metal gaps. Such a change associated with the NTC thermistor is compared to a predefined reference value or to a reference change measured from a reference NTC thermistor.

In some implementations, in accordance with a determination that a rate of a change of temperature in the NTC thermistor exceeds a threshold rate (e.g., IO °C. for one hour duration) or is distinct from that of the reference NTC thermistor, the electronic device determines that such a rate of the temperature change is caused by water ingress, and shuts down the rechargeable battery to prevent damage to the battery. In some implementations, in accordance with a determination that a corresponding temperature detected from the NTC thermistor exceeds a threshold temperature (e.g., exceeds 100° C.) or distinct from that detected from the reference NTC thermistor, the electronic device determines that detection of such a battery temperature is caused by water ingress, and thus, locks out the battery by disabling discharge charge field effect transistors (FETs) that are electrically coupled to the battery. In some situations, the battery protection system enables a three-way fuse FET to blow an internal fuse and disconnect the battery from the electronic device permanently.

In one aspect, some implementations include an electronic device that includes one or more rechargeable battery cells. The battery cells are configured to power operation of the electronic device. The electronic device also includes a negative temperature coefficient (NTC) thermistor proximate to the battery cells. The electric device also includes a capacitor coupled in parallel with the NTC thermistor. The capacitor has an open area and two electrodes that are at least partially exposed via the open area. The electrodes are electrically isolated. The electronic device further includes control circuit coupled to the NTC thermistor and the capacitor. The control circuit is configured to detect a voltage drop across the NTC thermistor and the capacitor if conductive liquid electrically connects the two electrodes that are at least partially exposed via the open area. In some implementations, the two electrodes of the capacitor are interdigitated and formed with the same conductive layer on a substrate, and at least partially overlap the open area.

In another aspect, some implementations include a battery protection circuit coupled to one or more rechargeable battery cells. The battery protection circuit includes an NTC thermistor proximate to the one or more rechargeable battery cells. The battery protection circuit also includes a capacitor coupled in parallel with the NTC thermistor. The capacitor has an open area and two electrodes that are at least partially exposed via the open area. The two electrodes are electrically isolated. The battery protection circuit also includes a control circuit coupled to the NTC thermistor and the capacitor. The control circuit is configured to detect a voltage drop across the NTC thermistor and the capacitor if conductive liquid electrically connects the two electrodes that are at least partially exposed via the open area.

In yet another aspect, a method is implemented to reconfigure a rechargeable battery to detect conductive liquid. The method includes providing a capacitor to be coupled in parallel with an NTC thermistor that is proximate to one or more rechargeable battery cells of an electronic device. The capacitor has an open area and two electrodes that are at least partially exposed via the open area, and the two electrodes are electrically isolated and configured to be coupled when conductive liquid enters the open area of the capacitor. A control circuit is coupled to the NTC thermistor and is configured to detect a voltage drop across the NTC thermistor and the capacitor and determine whether the voltage drop is caused by conductive liquid entering the open area of the capacitor.

In yet another aspect, a method is implemented to detect conductive liquid in a rechargeable battery. The method includes receiving a voltage drop across an NTC thermistor and a capacitor that are proximate to one or more rechargeable battery cells. The capacitor has an open area and two electrodes that are at least partially exposed via the open area, and the two electrodes are electrically isolated. The method further includes determining whether the voltage drop is caused by conductive liquid that electrically connects the two electrodes that are at least partially exposed via the open area of the capacitor.

Systems, devices, and methods are provided to supplement an integrated rechargeable battery with a capacitor that is coupled in parallel with an existing NTC thermistor, thereby allowing detection of conductive liquid in the integrated rechargeable battery without or with little change to existing architecture and configuration of the battery protection system. As such, this application provides simple and cost-effective solutions of detecting water ingress into integrated battery packs of electronic devices and protecting the integrated battery packs from further damage caused by the water ingress.

BRIEF DESCRIPTION OF THE DRAWINGS

For a better understanding of the various described implementations, reference should be made to the Detailed Description below, in conjunction with the following drawings in which like reference numerals refer to corresponding parts throughout the figures.

Like reference numerals refer to corresponding parts throughout the several views of the drawings.

DETAILED DESCRIPTION

Figure 1A:
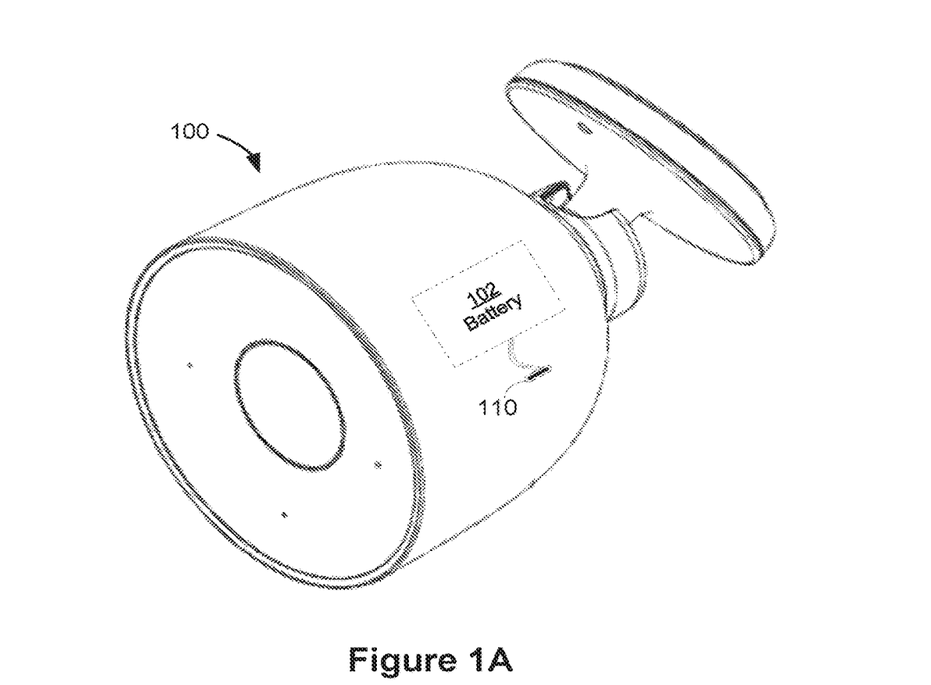
FIG. 1A illustrates an electronic device including a rechargeable battery in accordance with some implementations.

FIG. 1A shows an electronic device 100 including a rechargeable battery 102 in accordance with some implementations. The electronic device 100 can be a camera as shown, or a doorbell, door lock, display, connected assistant device, alarm, hazard detector, security detector, thermostat, or any other type of electronic device that is powered by a rechargeable battery 102. In some implementations, the electronic device 100 is used for outdoor applications. The electronic device 100 may include one or more mechanical seals for preventing water ingress. In some implementations, the electronic device 100 includes one or more components, such as: audio devices, light sources, sensors, central processing unit(s) (e.g., CPU(s) 114 in FIG. 1B), memory, data input devices, data output devices, image sensor array, infrared illuminators, filters, and at least a subset of the one or more components is powered by the rechargeable battery 102. In some implementations, the electronic device 100 is configured to connect electronically with an external device through a wired connection (e.g., a Universal Serial Bus (USB) cable, a power cable, a High-Definition Multimedia Interface (HDMI) cable, etc.). The wired connection may allow power and/or data transmission between the external device and electronic device 100. For example, the wired connection can be used to provide power to the battery 102.

Alternatively or additionally, in some implementations, the electronic device 100 includes one or more (external and/or visible) ports or connectors 110 for wired connections to the various components of the electronic device 100. Examples of the one or more ports or connectors 110 include, but are not limited to, USB connectors, and DC power connectors. In some implementations, the one or more ports 110 are on a surface of the electronic device 100 and allow for external access to the various components of the electronic device 100. In some implementations, the one or more ports 110 of the electronic device 100 can be used to charge the battery 102. For example, a wired connection is formed between the port 110 of the electronic device 100 and an external power source (e.g., a portable power cell, power generator, power bank, etc.), and can be used to transfer power from the external power source to the battery 102.

Figure 1B:
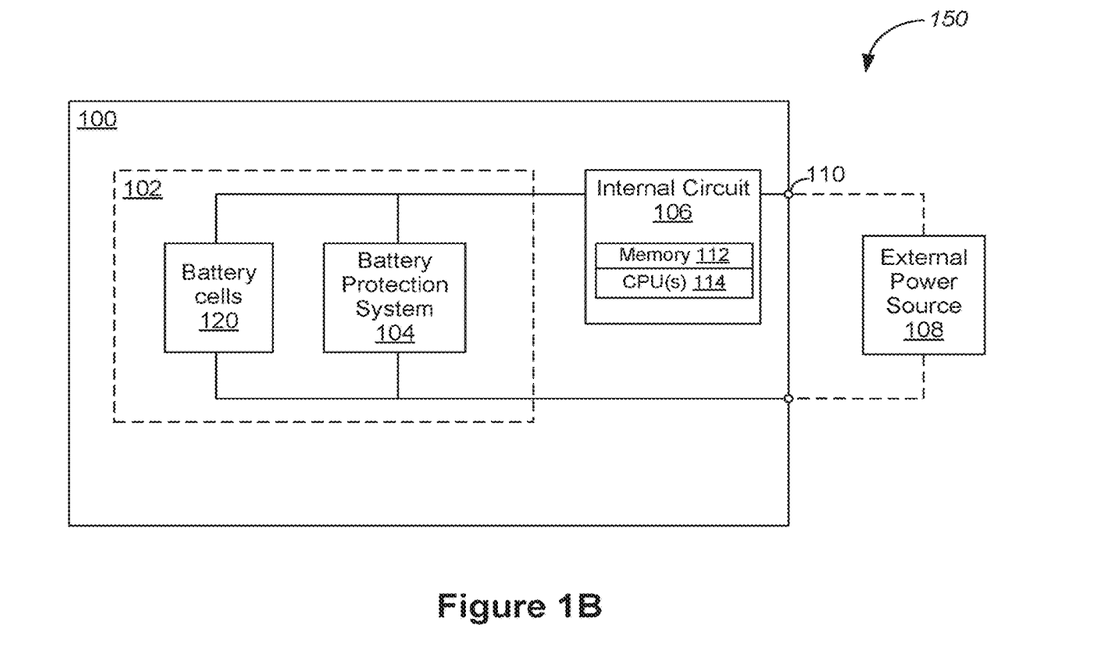
FIG. 1B is a block diagram of an electronic system including an electronic device coupled to an external power source, in accordance with some implementations.

FIG. 1B illustrates a block diagram of an electronic system 150 including an electronic device 100 coupled to an external power source 108, in accordance with some implementations. The electronic device 100 includes a rechargeable battery 102 having one or more battery cells 120 and a battery protection system 104. In some implementations, the rechargeable battery 102 is built into the electronic device 100 or is a replaceable module in the electronic device 100. In some implementations, the battery 102 includes a single rechargeable battery cell 120. In some implementations, the battery 102 includes a plurality of rechargeable battery cells 120 electrically coupled to each other. For example, the plurality of rechargeable battery cells 120 of the battery 102 can be coupled according to a 1SnP parallel battery configuration, in which n is an integer indicating a number of battery cells connected in parallel (e.g., 1S2P, 1S3P, 1S4P); an mS1P serial battery configuration, in which m is an integer indicating a number of battery cells connected in series (e.g., 2S1P); or an mSnP mixed battery configuration. In this application, the battery 102 broadly refers to a battery pack 102 that packages the one or more battery cells 120 with additional functional components (e.g., an NTC thermistor, the battery protection system 104, a battery heating element).

In some implementations, the one or more battery cells 120 are electrically coupled to the battery protection system 104 and an internal circuit 106. The internal circuit 106 includes various components of the electronic device 100, such as memory 112, CPU(s) 114, data input device(s), data output device(s), lens assemblies, heat sink(s), image sensor array(s), infrared illuminator(s), filter(s). In some implementations, an external power source 108 is coupled to the battery 102 and the internal circuit 106. The external power source 108 is used to charge the battery 102 of the electronic device 100. In some implementations, the one or more battery cells 120 and the battery protection system 104 are integrated into a single package/enclosure contained within the electronic device 100. In other implementations, the one or more battery cells 120 and the battery protection system 104 are packaged as distinct packages/components within the electronic device 100.

In some implementations, the battery protection system 104 is configured to protect the one or more battery cells 120 while the electronic device 100 is being charged by the external power source 108 and/or any other electrical source and/or while the battery 102 is being discharged to drive the internal circuit 106 of the electronic device 100. In some implementations, the battery protection system 104 is used to detect when at least one rechargeable battery cell 120 of the plurality of rechargeable battery cells that belong to the battery 102 disconnects or fails to charge. In some implementations, the battery protection system 104 is designed within a protection circuit module (PCM) of the battery 102.

In some implementations, the battery protection system 104 includes a capacitor that is packaged inside the battery 102. When electrodes of the capacitor are electrically coupled by the conductive liquid, the battery protection system 104 or the internal circuit 106 can detect conductive liquid entering the battery 102. In some implementations, in accordance with the detection of the conductive liquid, the battery protection system 104 or the internal circuit 106 may intervene (e.g., disable charging of the battery 102) to protect the battery 102 from damage to be caused by the conductive liquid. Additionally, in some implementations, upon detecting the conductive liquid entering the battery 102, the electronic device 100 generates a warning message indicating that the battery 102 has been exposed to the conductive liquid. The warning message is optionally broadcast via a speaker of the electronic device 100 or communicated to a client device via one or more communication networks for display on a user application executed on the client device.

Figure 2A:
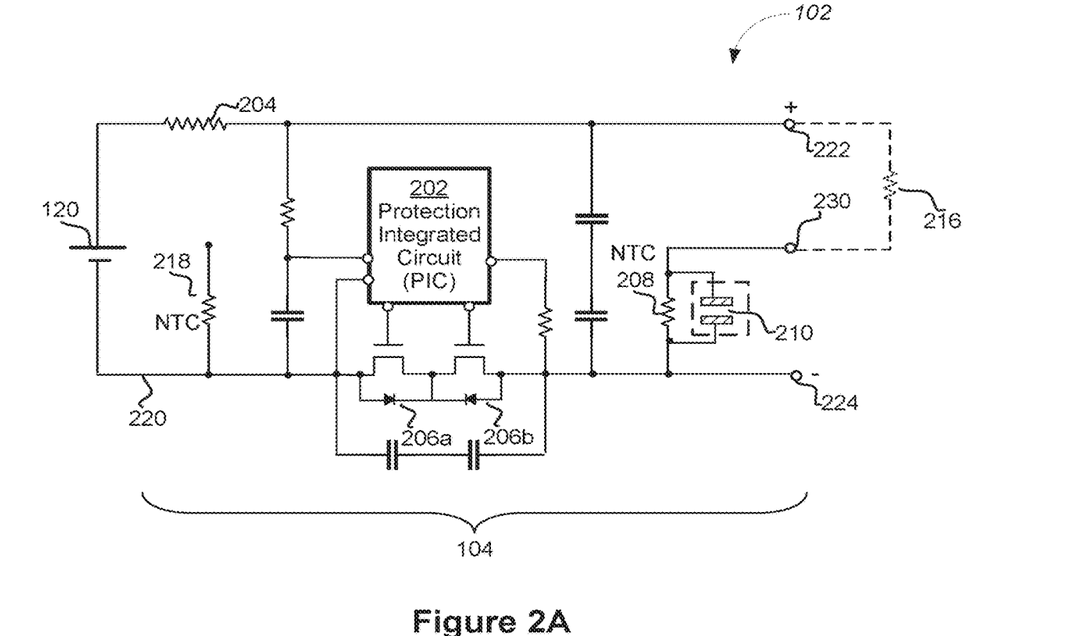
FIG. 2A is a schematic diagram of an example rechargeable battery (also called a battery pack) having a battery protection system coupled to one or more battery cells, in accordance with some implementations.
Figure 2B:
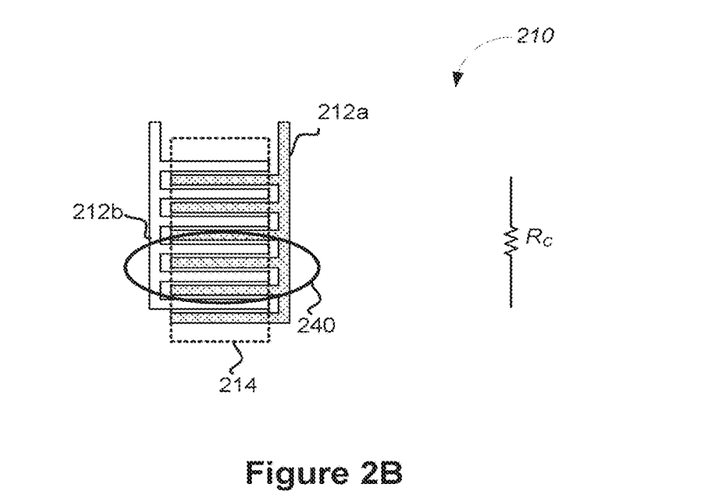
FIG. 2B illustrates an example open capacitor, in accordance with some implementations.

FIG. 2A is a schematic diagram of an example rechargeable battery 102 (also called a battery pack) having a battery protection system 104 coupled to one or more battery cells 120, in accordance with some implementations, and FIG. 2B illustrates an example open capacitor 210, in accordance with some implementations. The battery protection system 104 is configured to determine whether the battery 102 is functioning abnormally and disconnect the battery 102 upon detection of an abnormal condition (e.g., an overvoltage, undervoltage, overcurrent, or short circuit condition) of the battery 102. The battery protection system 104 includes a protection integrated circuit (PIC) 202 and a switching component 206. The PIC 202 is a coupled to the switching component 206, and configured to control charging and discharging of the one or more battery cells 120 via the switching component 206. In some implementations, the switching component 206 includes two switches 206a and 206b that are coupled in series with each other and with the one or more battery cells 120 along a charging and discharging path 220. For example, the two switches 206a and 206b are two integrated field effect transistors (FET) coupled back to back or a dual channel integrated FET. The switches 206a and 206b are controlled by the PIC 202 to manage charging and discharging of the one or more battery cells 120 separately. In some implementations now shown, the battery protection system 104 further includes a second PIC and a second switching component. The switch components are coupled in series with each other and with the one or more battery cells 120 along the charging and discharging path 220. Each switch component is controlled by a corresponding PIC to manage charging and discharging of the battery 102.

In some implementations, the battery protection system 104 further includes a positive thermal coefficient (PTC) resistor 204. A resistance of the PTC resistor 204 is low during normal operation of the battery 102 and increases to reduce a charging or discharging current flow when an operating temperature of the battery 102 increases above a threshold current level. In some implementations, the battery protection system 104 further includes a resettable fuse 204 in place of the PTC resistor 204.

In some implementations, the battery protection system 104 includes a negative thermal coefficient (NTC) thermistor 208 (e.g., a charger IC NTC thermistor). The NTC thermistor 208 is coupled between an NTC terminal 230 and a supply terminal 224, and has a resistance RNTC configured to vary with the operating temperature of the battery 102. An output of the NTC terminal 230 coupled to the NTC thermistor 208 is used to monitor the operating temperature of the battery 102 and determine whether the operating temperature is lower than a threshold temperature. Further, in some implementations, the NTC thermistor 208 is coupled in series with a reference resistor 216. The reference resistor 216 and the NTC thermistor 208 are electrically biased between two supply voltages (e.g., coupled to two supply terminals 222 and 224). The reference resistor 216 has a second resistance $R_{REF}$ that remains substantially constant or varies within a small tolerance with the operating temperature of the battery 102. The reference resistor 216 is optionally disposed out of the battery 102 (e.g., in the internal circuit 106) or inside the battery 102.

In some implementations, the capacitor 210 is coupled in parallel with the NTC thermistor 208, e.g., between the NTC terminal 230 and the supply terminal 224. Referring to FIG. 2B, the capacitor 210 has an open area 214 and two electrodes 212a and 212b that are at least partially exposed via the open area 214. In some implementations, the capacitor 210 includes a capacitor with open metal gaps. In some implementations, the entire open capacitor 210 is not covered by an insulation material (e.g., a dielectric material) and exposed to air. In some implementations, the capacitor 210 is covered by an insulation material (e.g., a dielectric material) that is partially removed on the open area 214. In this example, the two electrodes 212a and 212b of the capacitor 210 are interdigitated and formed with the same conductive layer on a substrate, and partially overlap the open area 214.

In some situations, during normal operating conditions (e.g., under dry conditions, in the absence of any conductive liquid), the two electrodes 212a and 212b of the capacitor 210 are electrically isolated from each other, and do not provide any resistor to be coupled in parallel with the NTC thermistor 208. Stated another way, when the open area 214 is exposed to air and no conductive liquid enters the open area 214, the two electrodes 212a and 212b are electrically decoupled in a direct current (DC) or low frequency domain, and the corresponding open capacitor 210 has a predefined capacitance that is configured to determine a high frequency response of the capacitor 210. As such, if a DC or low frequency voltage drop measured across the two terminals 230 and 224 varies, the variation is not caused by conductive liquid entering the battery 102, but by a change of the operating temperature of the battery 102.

In contrast, in some situations, conductive liquid 240 enters the electronic device 100 and lands on the open area 214 of the capacitor 210. A resistive path is formed from the conductive liquid 240 to electrically couple the two electrodes 212a and 212b, thereby converting the capacitor 210 to a resistor $R_C$ having an equivalent resistance in the direct current or low frequency domain. The equivalent resistance of the resistor $R_C$ converted from the capacitor 210 is determined based on at least a size of the open area 214, how the open area 214 is covered by the conductive liquid 240, and an electrical resistivity of the conductive liquid 240. As a consequence of the conductive liquid 240 entering the open area 214, this resistor $R_C$ converted from the capacitor 210 is coupled in parallel with the NTC thermistor 208, and in turn causes a change (e.g., a decrease) in a voltage drop across the NTC thermistor 208. Stated another way, in some implementations, the presence of the conductive liquid 240 on the capacitor 210 effectively places the resistor $R_C$ in parallel with the NTC thermistor 208, and causes a drop in an effective resistance seen from two terminals 230 and 224 of the NTC thermistor 208.

In some implementations, the drop in the effective resistance seen from the two terminals 230 and 224 of the NTC thermistor 208 depends on a resistance value $R_{NTE}$ of the NTC thermistor 208. For example, an NTC thermistor with a relatively large resistance value (e.g., 470 kA) has a higher degree of sensitivity to parallel resistance changes compared to another NTC thermistor that has a smaller resistance (e.g., 10 kA). Additionally, it is noted that when the conductive liquid 240 enters the open area 214, the effective resistance seen from two terminals 230 and 224 of the NTC thermistor 208 is still configured to vary with a change of the temperature of the battery 102, except that a sensitivity of the effective resistance to the temperature of the battery 102 is distinct from (e.g., less than) a sensitivity of a resistance of the NTC thermistor 208 to the temperature of the battery 102. More details on a temperature sensitivity and a rate of a sensitivity variation of the NTC thermistor 208 are explained below with reference to FIGS. 8A and 8B.

The NTC thermistor 208 and the capacitor 210 are electrically coupled to control circuit of the electronic device 100 (e.g., the internal circuit 106), which is configured to detect a voltage drop across the NTC thermistor 208 and the capacitor 210, e.g., in the DC and low-frequency domain. The internal circuit 106 is configured to determine whether the voltage drop is caused by conductive liquid 240 electrically connecting the two electrodes of the capacitor 210 or by an increase of the operating temperature of the battery 102. In some implementations, the internal circuit 106 determines whether the voltage drop is caused by conductive liquid electrically connecting the two electrodes of the capacitor 210 by measuring a voltage drop across the NTC thermistor 208 over time and determining an associated voltage drop rate. For example, the internal circuit 106 measures a time duration taken for a 10-90% voltage drop across the NTC thermistor 208 and determines the voltage drop rate corresponding to the 10-90% voltage drop. Further, in some implementations, the internal circuit 106 compares the voltage drop rate to a threshold voltage drop rate. The internal circuit 106 may determine that the voltage drop is caused by conductive liquid electrically connecting the two electrodes of the capacitor 210 in accordance with a determination that the voltage drop rate of the voltage is greater than the threshold voltage drop rate. Alternatively, in accordance with a determination that the drop rate of the voltage is not greater than the threshold drop rate, the internal circuit 106 may determine that the voltage drop is caused by a temperature increase of one or more battery cells 120 of the battery 102. More details on detecting conductive liquid in the battery 102 are explained below with reference to FIG. 7.

In some implementations, the electronic device 100 further includes a reference NTC thermistor 218 that is packaged inside the battery 102 or proximate to the battery 102. Optionally, the reference NTC thermistor 218 is part of the battery protection system 104. Optionally, the reference NTC thermistor 218 is located on the system side (e.g., as part of the internal circuit 106) of the electronic device 100 and is isolated from the battery protection system 104. The reference NTC thermistor 218 is isolated from the NTC thermistor 208 and the capacitor 210. As such, the reference NTC thermistor 218 is exposed to the same change of the temperature of the battery 102, but not influenced by conductive liquid entering the open area of the capacitor 210 and electrically connecting the two electrodes. The internal circuit 106 is configured to compare the effective resistances across the reference NTC thermistor 218 and the NTC thermistor 208 over time, to determine whether any change of the effective resistance of the reference NTC thermistor 218 is caused by conductive liquid entering the battery 102 or by the change of the temperature of the battery 102.

Specifically, in some implementations, the control circuit of the electronic device 100 (e.g., internal circuit 106) is configured to determine whether a voltage drop of the reference NTC thermistor 218 remains substantially the same when a change of the effective resistance of the NTC thermistor 208 is detected. If the voltage drop of the reference NTC thermistor 218 remains substantially the same, the change of the effective resistance of the NTC thermistor 208 is caused by conductive liquid entering the battery 102. Alternatively, if the voltage drop of the reference NTC thermistor 218 does not remain substantially the same and matches the change of the effective resistance of the NTC thermistor 208, the change of the effective resistance of the NTC thermistor 208 is caused by the change of the temperature of the battery 102. Conversely, if the voltage drop of the reference NTC thermistor 218 neither remains substantially the same nor matches the change of the effective resistance of the NTC thermistor 208, the change of the effective resistance of the NTC thermistor 208 may be caused by conductive liquid entering the battery 102.

In some implementations, the electronic device 100 (e.g., the internal circuit 106) is configured to generate a message indicating that the battery 102 has been exposed to the conductive liquid in accordance with a determination that the voltage drop across the NTC thermistor 208 and the capacitor 210 is caused by conductive liquid entering the open area of the capacitor 210 and electrically connecting the two electrodes.

Figure 3:
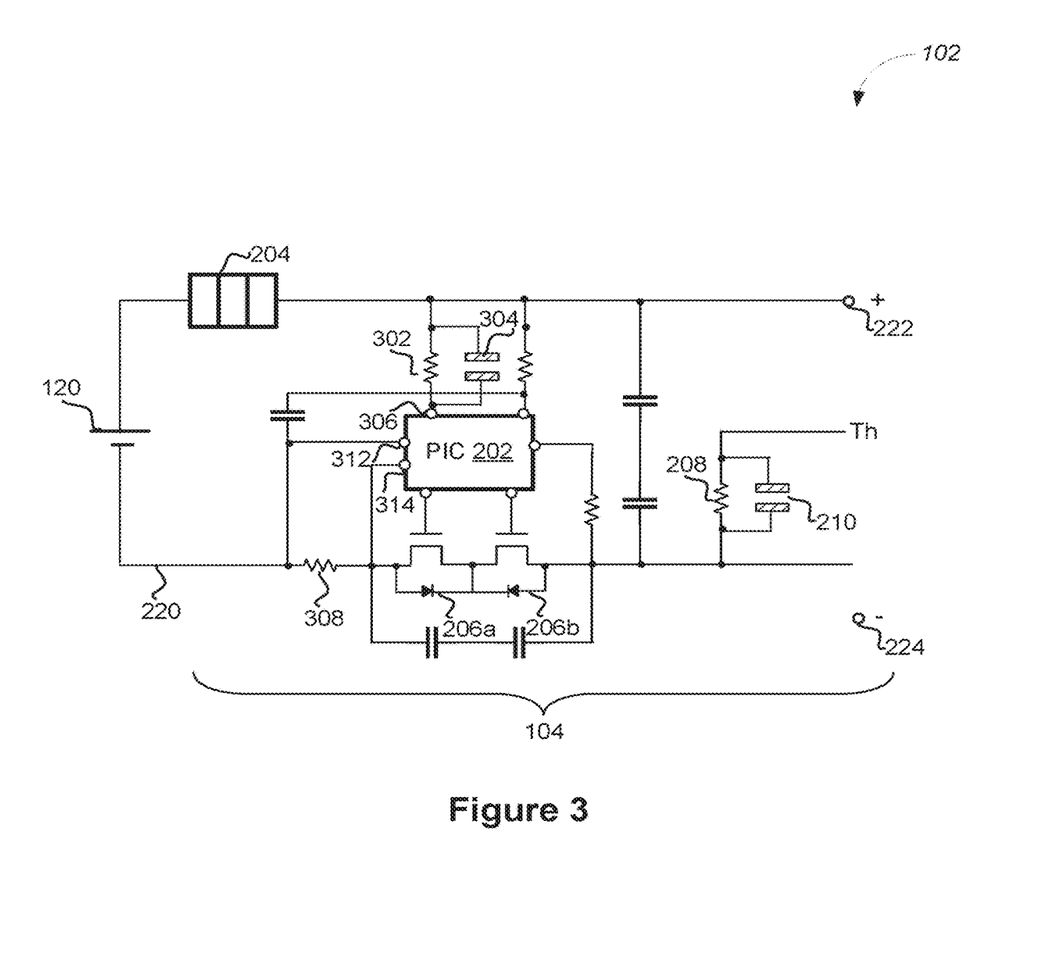
FIG. 3 is a schematic diagram of another example rechargeable battery having a battery protection system coupled to one or more battery cells, in accordance with some implementations.

FIG. 3 is a schematic diagram of another example rechargeable battery 102 (also called a battery pack) having a battery protection system 104 coupled to one or more battery cells 120, in accordance with some implementations. The battery protection system 104 includes a PIC 202, a switching component 206, and an NTC thermistor 208. The battery protection system 104 also includes another NTC thermistor 302 that is electrically coupled in parallel with another open capacitor 304. Like the capacitor 210, the capacitor 304 has an open area and two electrodes that are at least partially exposed via the open area. The NTC thermistor 302 and the capacitor 304 are coupled to the PIC 202, e.g., via an input 306 of the PIC 202. Control circuit (e.g., the PIC 202 or internal circuit 106) is configured to detect a voltage drop across the NTC thermistor 302 and the capacitor 304 if conductive liquid electrically connects the two electrodes that are at least partially exposed via the open area. Stated another way, the control circuit is configured to determine whether the voltage drop is caused by conductive liquid entering the open area of the capacitor 304 and electrically connecting the two electrodes. Additionally, in some implementations, the battery protection system 104 includes the capacitor 210 coupled to the NTC thermistor 208, and both of the capacitors 210 and 304 are configured to facilitate determining whether conductive liquid enters the battery 102.

A serial resistor 308 is coupled in series with the one or more battery cells 120 and the switching component 206 along the charging and discharging path 220 of the battery 102. In some implementations, the serial resistor 308 is immediately downstream of the one or more battery cells 120 on a direct current (DC) charging and discharging path 220 (e.g., along the same current path that is going through the one or more battery cells 120). In some implementations, the PIC 202 is coupled to the serial resistor 308. The PIC 202 is configured to use internal/integrated comparator logic to monitor a voltage drop on the serial resistor 308 (coupled to the PIC 202 via the inputs 312 and 314) and determine whether the one or more battery cells 120 are under an overcurrent or short circuit condition based on the voltage drop on the serial resistor 308. Alternatively, in some embodiments, the PIC 202 is configured to measure a battery voltage across the one or more battery cells 120 directly to detect an overvoltage or undervoltage condition.

In some implementations, the PIC 202 is configured to turn off a charging switch (e.g., switch 206b of the switching component 206) arranged on the charging and discharging path 220 of the battery 102 to disable charging of the battery 102. In some situations, the charging switch 206b is turned off in accordance with a determination that the battery 102 is charged by an excessively large charging current based on the voltage drop across the serial resistor 308 (i.e., under an overcharge or short circuit condition). In some situations, the charging switch 206b is turned off in accordance with a determination that the battery 102 is charged to an excessively large voltage (i.e., under an overvoltage condition). Likewise, in some implementations, the PIC 202 is configured to turn off a discharging switch (e.g., switch 206a of the switching component 206) arranged on the charging and discharging path 220 of the battery 102 to disable discharging of the battery 102. In some conditions, the discharging switch 206a is turned off in accordance with a determination that the battery 102 is discharging with an excessively large discharging current based on the voltage drop on the serial resistor 308 (i.e., under an over-discharge or short circuit condition. In some conditions, the discharging switch 206a is turned off in accordance with a determination that the one or more battery cells 120 has an excessively low voltage (i.e., under an undercharged condition).

In some implementations, the charging switch 206b and the discharging switch 206a are coupled in series with each other on the charging and discharging path 220 of the battery 102. In some implementations, the PIC 202 is configured to control charging and discharging of the battery 102 via the charging switch 206b and the discharging switch 206a, respectively, thereby protecting the battery 102 from an overcharge or overvoltage condition. In some implementations, each of the charging and discharging switches 206b and 206a includes a transistor device having a gate controlled by the PIC 202. In some other implementations, each of the charging and discharging switches 206b and 206a includes a transmission gate made of a pair of P-type and N-type transistors.

In some implementations, when conductive liquid enters the electronic device 100 and lands on the open area of the capacitor 304, the two electrodes of the capacitor 304 become electrically coupled, which in turn causes a decrease in an effective resistance of the NTC thermistor 302 and a decrease in a voltage drop across the NTC thermistor 302. The PIC 202 is configured to determine whether the decrease in the voltage drop across the NTC thermistor 302 is caused by an increase of a temperature of the battery 102 or by the conductive liquid entering the open area of the capacitor 304 and electrically connecting the two electrodes. Under some circumstances, the PIC 202 determines that the decrease in the voltage drop across the NTC thermistor 302 is caused by a temperature increase of the battery 102 and that the temperature of the battery 102 exceeds a threshold temperature value. The PIC 202 is configured to deactivate charging or discharging of the battery 102 (e.g., by disabling the charging switch 206b and the discharging switch 206a) in accordance with a determination that the temperature of the battery 102 exceeds the threshold temperature value. Similarly, under some circumstances, the PIC determines that the decrease in the voltage drop across the NTC thermistor 302 is caused by the conductive liquid entering the open area of the capacitor 304 and electrically connecting the two electrodes, and deactivates charging or discharging of the battery 102 (e.g., by disabling the charging switch 206b and the discharging switch 206a).

Figure 4:
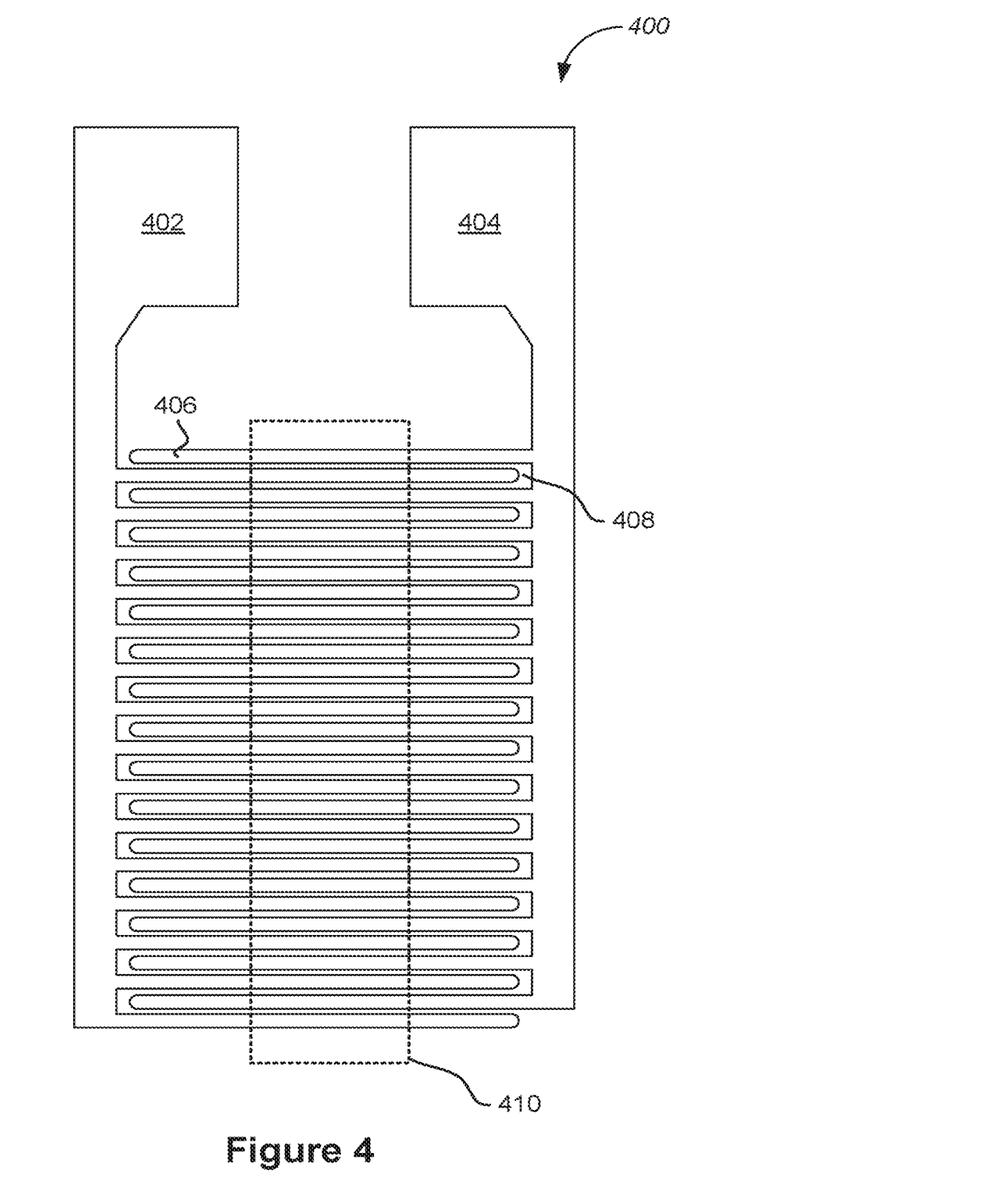
FIG. 4 illustrates another example open capacitor having interdigitated electrodes, in accordance with some implementations.

FIG. 4 illustrates another example open capacitor 400 having interdigitated electrodes 402 and 404, in accordance with some implementations. The capacitor 400 can be used as the capacitor 210 in FIG. 2 and/or the capacitor 304 in FIG. 3. The interdigitated electrodes 402 and 404 are made on a single layer of conductive material 406 (e.g., copper) with open gaps 408 interspersed between the conductive material 406. The capacitor 400 has an open area 410, and the interdigitated electrodes 402 and 404 are at least partially exposed via the open area 214. In some implementations, when the battery 102 having the capacitor 400 is exposed to conductive liquid, the conductive liquid comes into contact with and electrically couples (e.g., shorts) part of the interdigitated electrodes 402 and 404 that are exposed on open area 410, thereby converting the capacitor 400 to a resistor Re having an equivalent resistance in a DC or low frequency domain. When the resistor Re converted from the capacitor 400 is coupled in parallel to the NTC thermistor 208 in FIG. 2 or the NTC thermistor 302 in FIG. 3, an effective resistance of the NTC thermistor 208 or 302 is detected to drop, although no or little temperature increase occurs to the NTC thermistor 208 or 302 concurrently with the conductive liquid entering the open area 410 of the capacitor 400 and electrically connecting the two electrodes of the capacitor 400.

In some implementations not shown in FIG. 4, the open area 410 is covered at least partially by a non-conductive liquid-absorbing material (e.g., a sponge). When the capacitor 400 is placed in a vertical orientation, the non-conductive liquid-absorbing material is configured to keep liquid around the open area 410 and in proximity to the interdigitated electrodes 402 and 404 for water ingress fault detection. Further, in some implementations, the non-conductive liquid-absorbing material is extended from the open area 410 to another distinct location within the battery 102 (e.g., a different side of or a remote location on a protection circuit module), allowing the liquid that enters the battery 102 to be absorbed at the distinct location and guided to the open area 410 of the capacitor.

Figure 5:
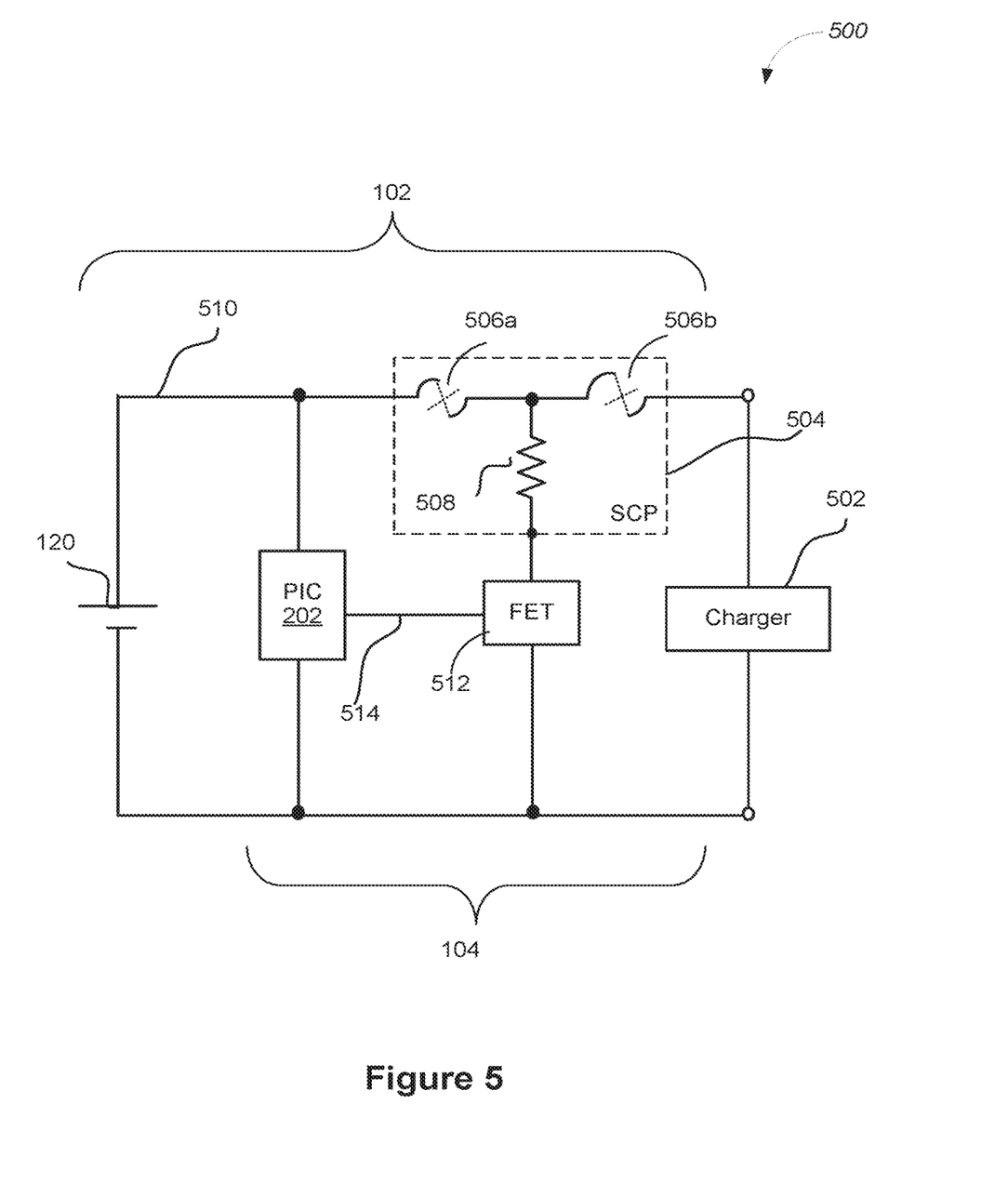
FIG. 5 is a schematic diagram of an electronic system having a battery coupled to a charger, in accordance with some implementations.

FIG. 5 is a schematic diagram of an electronic system 104 having a battery 102 coupled to a charger 502, in accordance with some implementations. The battery protection system 104 includes a self-control protector (SCP) 504 configured to cut off a charging and discharging path 510 in response to detection of an overcharge or overvoltage condition. In some implementations, the SCP 504 is configured to cut off a charging and discharging path 510 upon detection of a voltage drop across an NTC thermistor 208 or 302 and a corresponding open capacitor 210 or 304 and in accordance with a determination that the voltage drop is caused by conductive liquid entering the open area of the capacitor and electrically connecting the two electrodes of the capacitor.

The SCP 504 includes a fuse component (i.e., one of more fuses 506) and a heating element 508. The one or more fuses 506 are coupled in series on a battery charging and discharging path 510 of the battery 102. The heating element 508 is proximate to or under the one or more fuses 506, and controlled to heat up and melt the one or more fuses 506 upon detection of an overcharge or overvoltage condition or in accordance with a determination that the voltage drop across the NTC thermistor 208 or 302 is caused by the conductive liquid entering the open area of the capacitor 210 or 304 and electrically connecting its two electrodes. In an example, the heating element 508 is coupled in series with a field effect transistor (FET) 512. Control circuit (e.g., the PIC 202) is configured to generate a fuse enable signal 514 to enable the FET 512 to couple the heating element 508 to supply voltages. The heating element 508 is heated up to melt down the fuses 506 and disconnect the battery charging and discharging path 510 permanently.

Figure 6:
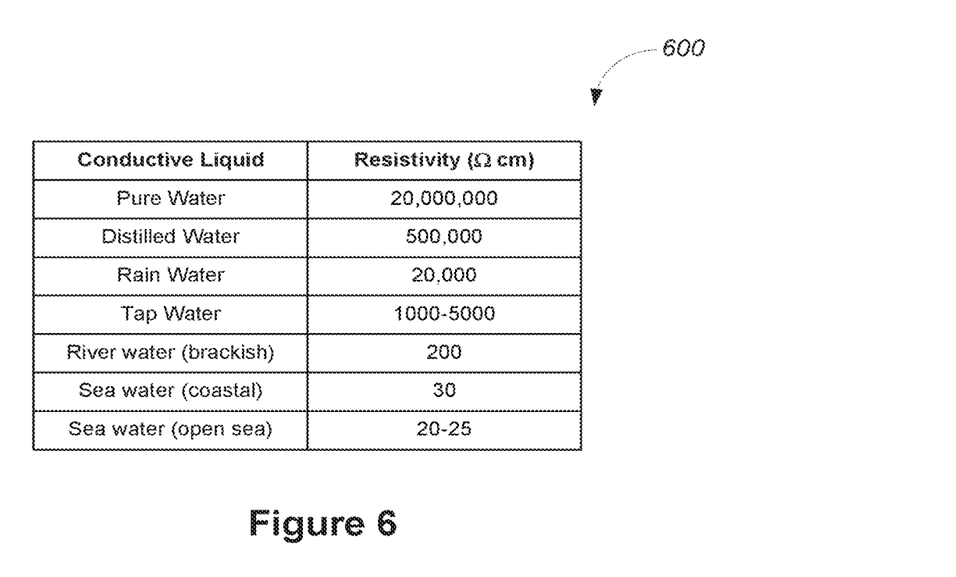
FIG. 6 is a table of example resistivity values of known conductive liquid types, in accordance with some implementations.

FIG. 6 is a table 600 of example resistivity values of known conductive liquid types, in accordance with some implementations. The table 600 lists the resistivity values for pure water, distilled water, rain water, tap water, river water, costal sea water, and open sea water. When one of these types of conductive liquid enters an open area of a capacitor 210 or 304, an equivalent resistance of a resistor Re converted from the capacitor 210 or 304 is determined based on at least a size of the open area, how the open area is covered by the conductive liquid, and an electrical resistivity of the conductive liquid entering the open area and electrically connecting the two electrodes. A decrease of an effective resistance of a corresponding NTC thermistor 208 or 302 is further determined based on the equivalent resistance of a resistor Re converted from a capacitor 210 or 304. Referring to FIG. 6, the equivalent resistance of the resistor Re converted from the capacitor 210 or 304 varies up to six orders based on the resistivity values of the conductive liquid types, so is the drop of the effective resistance of the corresponding NTC thermistor 208 or 302 in some situations.

In some implementations, control circuit associated with the battery 102 (e.g., the internal circuit 106 or PIC 202) is configured to determine that the voltage drop across the NTC thermistor 208 or 302 and the corresponding open capacitor is caused by conductive liquid entering the open area of the capacitor and identify a type of conductive liquid in accordance with such a determination. For example, the internal circuit 106 may compare the voltage drop across the NTC thermistor 208 and the capacitor 210 with a plurality of reference voltage drops. Each reference voltage drop corresponds to a respective one of the known conductive liquid types as illustrated in FIG. 6. The internal circuit 106 identifies the type of the conductive liquid from the plurality of known conductive liquid types in accordance with the comparison.

In some implementations, the memory 112 is configured to store reference values (e.g., resistance values, resistivity values in FIG. 6, and/or voltage drops) corresponding to the known conductive liquid types. The control circuit is configured to determine the plurality of reference voltage drops based on the stored reference values. In one example, if the stored reference values are resistivity values, the internal circuit 106 may generate the plurality of reference voltage drops by calculating the reference voltage drops based on the resistivity values directly or by using resistors having the resistivity values to match an impact of the conductive liquid. In another example, if the stored reference values are voltage drop values, the control circuit directly compare the voltage drop across the NTC thermistor 208 or 302 and the capacitor with the stored reference values.

Figure 7:
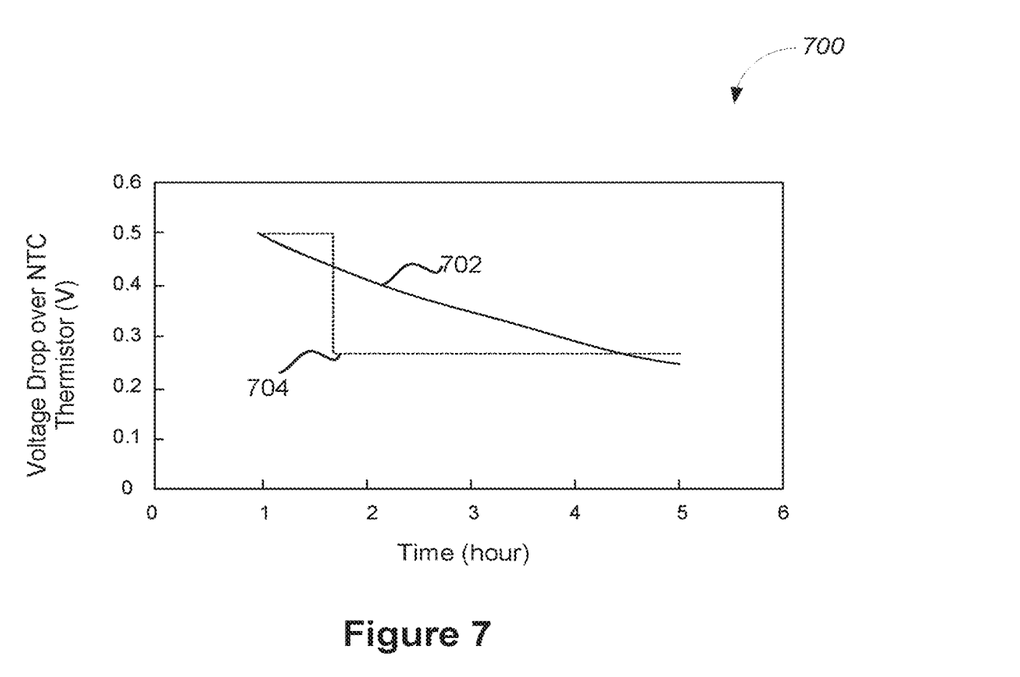
FIG. 7 illustrates a temporal diagram of an effective resistance of an NTC thermistor that is coupled in parallel with a capacitor, in accordance with some implementations.

FIG. 7 illustrates a temporal diagram 700 of an effective resistance of an NTC thermistor 208 or 302 that is coupled in parallel with a capacitor 210 or 304, in accordance with some implementations. The effective resistance of an NTC thermistor 208 or 302 responds differently in response to a temperature variation and conductive liquid entering an open area of the capacitor 210 or 304. The temperature variation occurs during an extended duration of time corresponding to a first response time, while the conductive liquid impacts performance of the NTC thermistor 208 and open capacitor 210 instantaneously, i.e., in a short instant corresponding to a second response time that is less than the first response time. In some implementations, a threshold response time or a threshold drop rate is defined, and a voltage drop across the NTC thermistor 208 or 302 is monitored. A response time or a temporal drop rate of the voltage drop across the NTC thermistor 208 or 302 is compared with the predefined threshold response time or temporal drop rate to determine whether the voltage drop is caused by conductive liquid or a temperature increase.

In an example, the voltage drop 702 across the NTC thermistor 208 and open capacitor 210 decreases by 0.25 V due to an increase of 25° C. in the temperature of the battery 102. This voltage drop occurs gradually and lasts for approximately four hours. In contrast, the voltage drop 704 across the NTC thermistor 208 and open capacitor 210 decreases by 0.25 V due to conductive liquid entering the capacitor 210. This voltage drop 704 occurs within the short instant and lasts for less than a minute. An example threshold response time is 1 minute for a characteristic voltage drop of 0.5 V or for a 10-90% voltage drop, and an example drop rate is 1 V/minute. Any voltage drop having a response time shorter than the threshold response time or a temporal drop rate faster than the threshold drop rate is determined to be caused by an event of conductive liquid entering the battery 102.

Specifically, in some implementations, the temporal drop rate of the voltage drop across the NTC thermistor 208 and open capacitor 210 is compared to a threshold drop rate. In accordance with a determination that the temporal drop rate of the voltage is greater than the threshold drop rate, the control circuit of the electronic device 100 determines that the voltage drop is caused by conductive liquid entering the open area of the capacitor and electrically connecting the two electrodes of the capacitor. Conversely, in accordance with a determination that the temporal drop rate of the voltage is not greater than the threshold drop rate, the control circuit of the electronic device 100 determines that the voltage drop is caused by a temperature increase of the one or more rechargeable battery cells of the battery 102.

Figure 8A:
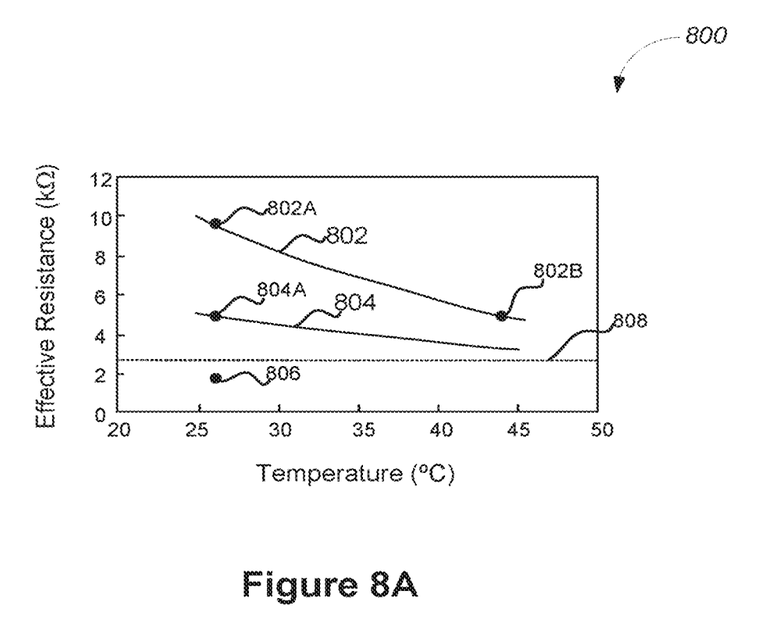
FIG. 8A is a diagram of an effective resistance of an NTC thermistor that varies with a temperature, in accordance with some implementations.
Figure 8B:
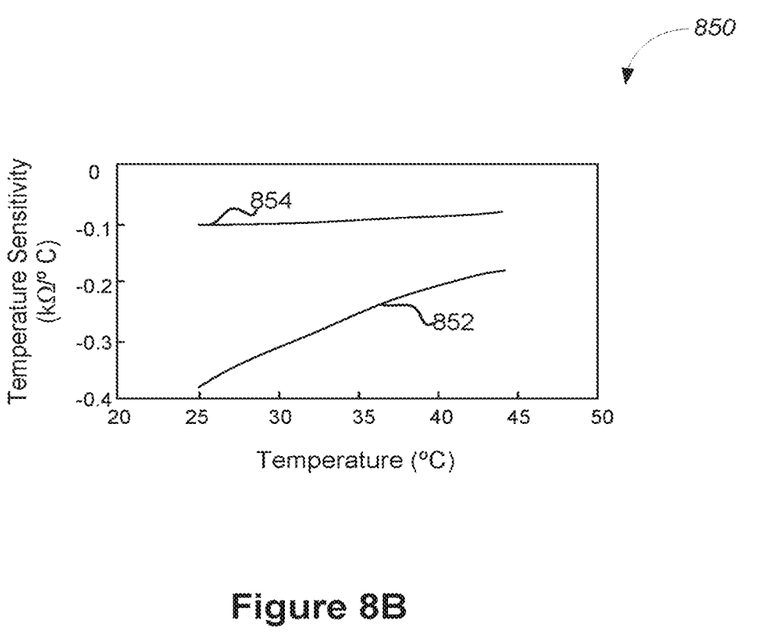
FIG. 8B is a diagram of a temperature sensitivity of an NTC thermistor that varies with a temperature, in accordance with some implementations.

FIG. 8A is a diagram 800 of an effective resistance of an NTC thermistor 208 or 302 that varies with a temperature, in accordance with some implementations, and FIG. 8B is a diagram 850 of a temperature sensitivity of an NTC thermistor 208 or 302 that varies with a temperature, in accordance with some implementations. Curves 802 and 852 represent the effective resistance and temperature sensitivity of the NTC thermistor itself as a function of a temperature of the battery 102, respectively. When a capacitor coupled in parallel to the NTC thermistor is converted to a resistor $R_C$ due to conductive liquid entering the battery 102, curves 802 and 854 go down to Curves 804 and 854, which represent the effective resistance and temperature sensitivity of a combination of the NTC thermistor and open capacitor as a function of the temperature of the battery 102, respectively. As such, when conductive liquid enters the battery 102, a voltage across the NTC thermistor and open capacitor drops and responds differently to the temperature of the battery 102, compared with when no conductive liquid enters the battery 102.

Referring to FIG. 8A, in some implementations, when conductive liquid enters the battery 102 at a given temperature, the effective resistance of the NTC thermistor drops from a point 802A on the curve 802 to a point 804A on the curve 804. The curve 802 has a point 802B that matches the effective resistance with the point 804A, and therefore, it needs to be determined whether the effective resistance drops due to a temperature increase of the battery 102 or the conductive liquid entering the battery. Alternatively, in some implementations, a low resistivity conductive liquid enters the battery 102. The effective resistance of the NTC thermistor drops from the point 802A on the curve 802 to a point 806 below a resistance drop limit 808. The resistance drop limit 808 is less than the effective resistance of the NTC thermistor on the curve 802 at least up to a temperature limit (e.g., 100° C.) which is rarely reached by the battery 102. That said, in some situations, the control circuit of the electronic device 100 identifies a voltage drop limit corresponding to a temperature increase of the one or more rechargeable battery cells, e.g., the voltage drop limit corresponds to the resistance drop limit 808 and is at least lower than a voltage drop across the NTC thermistor at the temperature limit. A voltage drop across the NTC thermistor and the capacitor is compared with the voltage drop limit. If the voltage drop is caused by the temperature increase, it never reaches the voltage drop limit. As such, in accordance with a determination that the voltage drop exceeds the voltage drop limit, the control circuit of the electronic device 100 can determine that the voltage drop is caused by conductive liquid entering the battery 102 rather than by the temperature variation of the battery 102.

Referring to FIG. 8B, when an NTC thermistor 208 or 302 is applied in a battery protection system 104, its temperature sensitivity 852 and rate of a sensitivity variation with respect to a temperature are known. When a capacitor coupled in parallel to the NTC thermistor is converted to a resistor $R_C$ due to conductive liquid entering the battery 102, the curve 852 corresponding to the temperature sensitivity of the NTC thermistor 208 or 302 shifts to another curve (e.g., to the curve 854). In some implementations, the control circuit of the electronic device 100 monitors a temperature sensitivity of a voltage drop across the NTC thermistor and open capacitor or a rate of the sensitivity variation with respect to the temperature of the battery 102. In accordance with a determination that the temperature sensitivity or the rate of the sensitivity variation of the voltage drop does not match the sensitivity curve 852, the control circuit of the electronic device 100 determines that the voltage drop is caused by conductive liquid entering the battery 102 (specifically, the open area of the capacitor 210 or 304).

Figure 9:
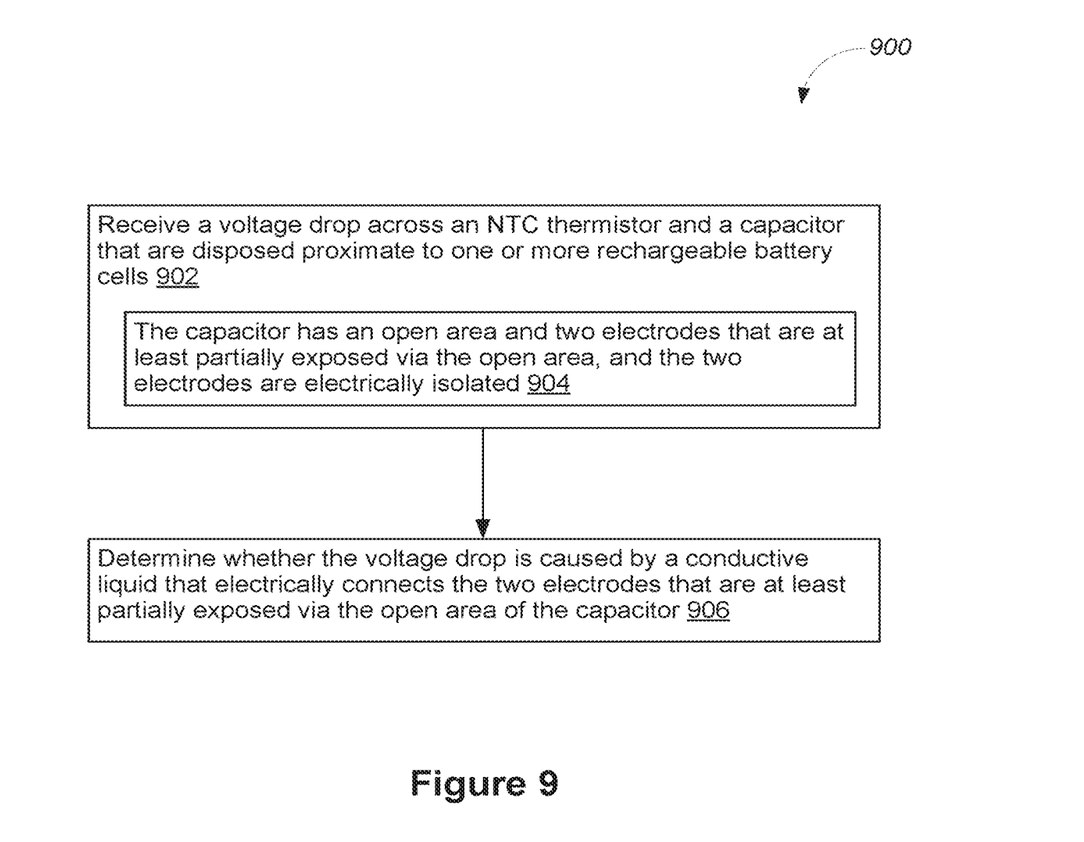
FIG. 9 is a flowchart of an example method of detecting conductive liquid in a rechargeable battery, in accordance with some implementations.

FIG. 9 is a flowchart of an example method 900 of detecting conductive liquid in a rechargeable battery 102, in accordance with some implementations. An NTC thermistor 208 or 302 and a capacitor 210 or 304 are proximate to one or more rechargeable battery cells 120 of the rechargeable battery 102. A voltage drop across the NTC thermistor and capacitor is received (902). The capacitor 210 or 304 has (904) an open area and two electrodes that are at least partially exposed via the open area, and the two electrodes are electrically isolated. It is then determined (906) whether the voltage drop is caused by conductive liquid that electrically connects the two electrodes that are at least partially exposed via the open area of the capacitor.

In some implementations, in accordance with a determination that the voltage drop across the NTC thermistor and the capacitor is caused by conductive liquid electrically connecting the two electrodes of the capacitor, a message is generated to indicate that the one or more rechargeable battery cells have been exposed to the conductive liquid. In some implementations, a fuse component 506 is coupled on a battery charging and discharging path of the one or more rechargeable battery cells 120. In accordance with a determination that the voltage drop is caused by the conductive liquid electrically connecting the two electrodes of the capacitor, a fuse enable signal is generated to activate the fuse component to disconnect the battery charging and discharging path permanently. In some implementations, a temporal drop rate is determined for the voltage drop across the NTC thermistor and the capacitor. Whether the voltage drop is caused by conductive liquid or a temperature increase is determined based on the temporal drop rate of the voltage drop.

It should be noted that details described with respect to FIGS. 1-8 are also applicable in an analogous manner to the method 900 described above with respect to FIG. 9. For brevity, these details are not repeated here.

The terminology used in the description of the various described implementations herein is for the purpose of describing particular implementations only and is not intended to be limiting. As used in the description of the various described implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. Additionally, it will be understood that, although the terms "first," "second," etc. may be used herein to describe various elements, these elements should not be limited by these terms. These terms are only used to distinguish one element from another.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

The foregoing description, for purpose of explanation, has been described with reference to specific implementations. However, the illustrative discussions above are not intended to be exhaustive or to limit the claims to the precise forms disclosed. Many modifications and variations are possible in view of the above teachings. The implementations were chosen and described in order to best explain principles of operation and practical applications, to thereby enable others skilled in the art.

Although various drawings illustrate a number of logical stages in a particular order, stages that are not order dependent may be reordered and other stages may be combined or broken out. While some reordering or other groupings are specifically mentioned, others will be obvious to those of ordinary skill in the art, so the ordering and groupings presented herein are not an exhaustive list of alternatives. Moreover, it should be recognized that the stages can be implemented in hardware, firmware, software or any combination thereof.

What is claimed is:

1. An electronic device comprising:
   a housing;
   a first thermistor;
   a capacitor electrically coupled to the first thermistor, the capacitor and the first thermistor electrically coupled in series or in parallel, the capacitor having two electrodes that are configured to be electrically isolated and are at least partially exposed in an open area within the housing; and
   a control circuit configured to detect a first voltage drop across at least one of the first thermistor or the capacitor if an ingress contaminant electrically connects the two electrodes.

2. The electronic device of claim 1, wherein the electronic device further comprises:
   a second thermistor, the second thermistor physically isolated from the first thermistor and the capacitor; and
   one or more processors, the one or more processors configured to obtain:
     first information indicative of the first voltage drop across at least one of the first thermistor or the capacitor; and
     second information indicative of a second voltage drop across the second thermistor.

3. The electronic device of claim 2, wherein the one or more processors are configured to:
   calculate, responsive to obtaining the first information and the second information, a difference between the first voltage drop and the second voltage drop; and
   determine, based on the difference, that the first voltage drop is in response to the ingress contaminant electrically connecting the two electrodes.

4. The electronic device of claim 3, wherein the determination comprises:
   identifying whether a difference between the first voltage drop and the second voltage drop exceeds a threshold amount; or
   identifying, based on the second information, whether the second voltage drop is below a threshold amount.

5. The electronic device of claim 3, wherein the one or more processors are further configured to:
   generate, based on a determination that the first voltage drop is in response to the ingress contaminant, a message indicative of a warning of ingress contaminants in the housing of the electronic device.

6. The electronic device of claim 5, wherein the one or more processors are further configured to:
   transmit the message to a client device via one or more communication networks for display on a user application executed on the client device; or
   output the message via a speaker of the electronic device.

7. The electronic device of claim 2, wherein the second information indicative of the second voltage drop indicates that the second voltage drop is zero.

8. The electronic device of claim 2, wherein the second thermistor and the one or more processors are packaged on the control circuit.

9. The electronic device of claim 2, wherein:
   the first thermistor is exposed to air, and
   the second thermistor is covered by an insulation material.

10. The electronic device of claim 2, wherein the one or more processors are further configured to:
    identify a voltage drop limit corresponding to a temperature increase internal to the housing of the electronic device;
    compare the voltage drop across at least one of the first thermistor or the capacitor with the voltage drop limit; and
    determine whether the voltage drop exceeds the voltage drop limit.

11. The electronic device of claim 1, wherein the two electrodes of the capacitor are interdigitated and formed with the same conductive layer on a substrate.

12. The electronic device of claim 1, wherein the electronic device further includes one or more rechargeable batteries.

13. The electronic device of claim 12, further comprising:
    a fuse component electrically coupled to a charging and discharging path of the one or more rechargeable batteries; and
    wherein the control circuit, responsive to a detection of the first voltage drop across at least one of the first thermistor or the capacitor due to an ingress contaminant electrically connecting the two electrodes, is configured to generate a fuse enable signal to activate the fuse component effective to disconnect the charging and discharging path.

14. The electronic device of claim 12, further comprising:
    a switching component coupled in series with the one or more rechargeable batteries on a charging and discharging path, the control circuit configured to control the switching component to manage charging and discharging of the one or more rechargeable batteries via the charging and discharging path.

15. The electronic device of claim 14, wherein the control circuit is configured to control the switching component to disable charging and discharging of the one or more rechargeable batteries when the first voltage drop across at least one of the first thermistor or the capacitor exceeds a threshold voltage drop.

16. The electronic device of claim 12, wherein the first thermistor and the capacitor are packaged inside the one or more rechargeable batteries.

17. The electronic device of claim 1, wherein the first thermistor is a negative temperature coefficient (NTC) thermistor.

18. The electronic device of claim 1, wherein the ingress contaminant comprises at least one of an electrically conductive liquid or solid.

19. The electronic device of claim 1, the control circuit is further configured to:
    determine a temporal drop rate of the voltage drop across at least one of the first thermistor or the capacitor; and
    determine whether the voltage drop is caused by the ingress contaminant or a change in temperature.

20. The electronic device of claim 2, wherein the first thermistor is electrically coupled to the second thermistor in series.

* * * * *